US010253860B2

(12) United States Patent
Richards et al.

(10) Patent No.: US 10,253,860 B2
(45) Date of Patent: Apr. 9, 2019

(54) DRIVELINE AND METHOD OF CONTROLLING A DRIVELINE

(71) Applicant: Jaguar Land Rover Limited, Whitley, Coventry, Warwickshire (GB)

(72) Inventors: Karl Richards, Leamington Spa (GB); Simon Owen, Redditch (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 288 days.

(21) Appl. No.: 15/111,791

(22) PCT Filed: Nov. 26, 2014

(86) PCT No.: PCT/EP2014/075603
§ 371 (c)(1),
(2) Date: Jul. 14, 2016

(87) PCT Pub. No.: WO2015/110203
PCT Pub. Date: Jul. 30, 2015

(65) Prior Publication Data
US 2016/0356370 A1 Dec. 8, 2016

(30) Foreign Application Priority Data
Jan. 24, 2014 (GB) .................................. 1401182.9

(51) Int. Cl.
*F16H 48/22* (2006.01)
*B60W 10/16* (2012.01)
(Continued)

(52) U.S. Cl.
CPC ............. *F16H 48/22* (2013.01); *B60W 10/16* (2013.01); *B60W 10/184* (2013.01);
(Continued)

(58) Field of Classification Search
CPC .............. F16H 48/22; F16H 2048/204; B60W 30/18172; B60W 40/06; B60W 2520/266
See application file for complete search history.

(56) References Cited

U.S. PATENT DOCUMENTS

| 4,936,404 A | 6/1990 | Matsumoto |
| 5,082,081 A * | 1/1992 | Tsuyama .................. B60T 8/175 |
| | | 180/197 |

(Continued)

FOREIGN PATENT DOCUMENTS

| CN | 102666178 A | 9/2012 |
| EP | 0321893 A2 | 12/1988 |

(Continued)

OTHER PUBLICATIONS

"Live demonstration of Subaru Forester and Outback's 4x4 symmetrical all wheel drive system", Nov. 15, 2011, 1 page. To be retrieved from the Internet: https://www.youtube.com/watch?v=mryGnENTsol Minute 0:38-1:49 Minute 4:06-4:52.

(Continued)

*Primary Examiner* — Edwin A Young
(74) *Attorney, Agent, or Firm* — Reising Ethington P.C.

(57) ABSTRACT

A motor vehicle controller configured to reduce net drive torque applied to one or more driving wheels of a first axle of a driveline when an amount of slip of a driving wheel of the first axle exceeds a first predetermined threshold value. The controller controls torque applied to wheels of a second axle and determines when the vehicle is operating in a split-mu condition in which slip of a driving wheel on one side of each of the two axles exceeds that of a driving wheel on an opposite side of the axles by more than a predetermined amount. The controller performs a split-mu mitigation operation by reducing net torque applied to a driving wheel of the axle that is experiencing the greater slip when (Continued)

an amount of slip of that driving wheel exceeds a second predetermined threshold value less than the first predetermined threshold value.

20 Claims, 3 Drawing Sheets

(51) Int. Cl.
  *B60W 10/184* (2012.01)
  *B60W 30/18* (2012.01)
  *B60W 40/06* (2012.01)
  *B60W 30/186* (2012.01)
  *F16H 48/20* (2012.01)

(52) U.S. Cl.
  CPC ...... *B60W 30/18172* (2013.01); *B60W 40/06* (2013.01); *B60W 30/186* (2013.01); *B60W 2520/266* (2013.01); *B60W 2550/14* (2013.01); *B60W 2550/148* (2013.01); *B60W 2720/266* (2013.01); *B60W 2720/403* (2013.01); *B60W 2720/406* (2013.01); *B60Y 2300/82* (2013.01); *F16H 2048/204* (2013.01)

(56) References Cited

U.S. PATENT DOCUMENTS

| | | | |
|---|---|---|---|
| 5,172,787 A | * | 12/1992 | Kobayashi ............. B60K 23/04 180/197 |
| 5,358,317 A | * | 10/1994 | Cikanek .................. B60L 3/108 303/152 |
| 5,636,121 A | | 6/1997 | Tsuyama et al. |
| 9,045,141 B2 | | 6/2015 | Dehren et al. |
| 2002/0109309 A1 | | 8/2002 | Schulke et al. |
| 2012/0116641 A1 | | 5/2012 | Crosman, III et al. |
| 2012/0259523 A1 | | 10/2012 | Dehren et al. |
| 2014/0058643 A1 | | 2/2014 | Kodama |

FOREIGN PATENT DOCUMENTS

| | | |
|---|---|---|
| GB | 2454337 A | 5/2009 |
| GB | 2500698 A | 10/2013 |
| JP | 2007069760 A | 3/2007 |
| WO | WO2013144346 A1 | 10/2013 |

OTHER PUBLICATIONS

Combined Search and Examination Report corresponding to application No. GB1401182.8, dated Aug. 18, 2014, 8 pages.
International Search Report corresponding to International application No. PCT/EP2014/075603, dated Feb. 19, 2015, 7 pages.
Written Opinion corresponding to International application No. PCT/EP2014/075603, dated Feb. 19, 2015, 10 pages.
Combined Search and Examination Report corresponding to application No. GB1420957.1, dated May 22, 2015, 6 pages.
Chinese Office Action in Chinese with English translation for CN application No. 201480073962.8, dated Mar. 13, 2018, 11 pages.

* cited by examiner

DRIVELINE AND METHOD OF CONTROLLING A DRIVELINE

FIELD OF THE INVENTION

The present invention relates to a motor vehicle and to a method of controlling a motor vehicle. In particular but not exclusively the invention relates to motor vehicles such as all-terrain vehicles (ATVs) having a driveline that is operable to change the number of wheels that provide torque to drive the vehicle.

BACKGROUND

It is known to provide a motor vehicle having a four wheel drive mode of operation in which motive power is supplied to each of two pairs of wheels of the vehicle. Motive power is supplied to the wheels by means of a driveline.

Some known vehicles have a driveline arranged such that motive power is permanently supplied to both pairs of wheels such that the vehicle is permanently in a four wheel drive configuration. Some other vehicles are arranged such that motive power is selectively supplied to either only one pair or to both pairs of wheels. A driver operable selector may be provided to allow the driver to select two wheel or four wheel operation. Some driveline systems require the vehicle to be stationary when transitioning between two and four wheel drive modes. Such systems may be referred to as static disconnect/reconnect systems. More advanced drivelines systems such as that disclosed in GB2407804 allow a vehicle to switch between two wheel and four wheel drive operation whilst a vehicle is moving. Such systems may be referred to as dynamic driveline systems.

It is an aim of embodiments of the present invention to provide an improved driveline system that at least partially mitigates disadvantages of existing dynamic driveline systems.

STATEMENT OF THE INVENTION

Embodiments of the invention may be understood by reference to the appended claims.

Aspects of the invention provide a controller, a control system, a motor vehicle, a computer readable medium and a method.

In one aspect of the invention for which protection is sought there is provided a motor vehicle controller configured to cause a reduction in an amount of net drive torque applied to one or more driving wheels of a first axle of a driveline when an amount of slip of a driving wheel of said first axle exceeds a first predetermined threshold value, the controller being further configured to control an amount of torque applied to respective left and right wheels of a second axle by means of left and right wheel variable torque coupling means of a driveline, the controller comprising means for determining when a vehicle is operating in a split-mu condition in which slip of a driving wheel on one side of each of the first and the second axles exceeds that of a driving wheel on an opposite side of each of the first and the second axles by more than a predetermined amount, wherein when a split-mu condition is determined to exist the controller is configured to perform a split-mu mitigation operation in which the controller causes a reduction in net torque applied to a driving wheel of said first axle that is experiencing the greater slip when an amount of slip of that driving wheel exceeds a second predetermined threshold value less than the first predetermined threshold value.

Causing a reduction in an amount of net drive torque applied to one or more driving wheels of a first axle of a driveline when an amount of slip of a driving wheel of said first axle exceeds a first predetermined threshold value may be performed in a first control mode, causing a reduction in net torque applied to a driving wheel of said first axle that is experiencing the greater slip when an amount of slip of that driving wheel exceeds a second predetermined threshold value less than the first predetermined threshold value may be performed in a second control mode.

The controller may comprise an electronic processor having an electrical input for receiving one or more signals indicative of values of wheel speed; and an electronic memory device electrically coupled to the electronic processor and having instructions stored therein. The processor may be configured to access the memory device and execute the instructions stored therein such that it is operable as described herein.

Thus, if a split-mu condition does not exist, the controller does not perform the split-mu mitigation operation, and a reduction in net torque applied to one or more driving wheels of said first axle is not caused to occur unless an amount of slip of a driving wheel of a first axle exceeds the first predetermined threshold value, which is greater than the second predetermined threshold value.

It is to be understood that the reduction in net torque to a driving wheel of a first axle that is experiencing the greater slip is caused in order to reduce a speed of rotation of the wheel. The reduction in net torque may be accomplished by application of brake torque to this driving wheel and/or by a reduction in powertrain drive torque applied to this driving wheel.

It is to be understood that the first axle may comprise an open differential. A prop shaft or other drive transmitting means may couple the first and second axles such that an input of the left and right wheel variable torque coupling means rotates at the same speed as the faster turning driving wheel of the first axle. The variable torque coupling means may therefore have an input that rotates at a speed up to the first threshold value when a split-mu condition does not exist, and at a speed up to the second threshold value when a split-mu condition does exist.

It is to be understood that when the split-mu condition exists, the left and right wheel variable torque coupling means associated with the second axle may cause a reduction in speed of the driving wheel of the second axle that is experiencing the higher level of slip by reducing the amount of torque coupled by the torque coupling means to that wheel. Consequently a speed difference will exist across the torque coupling means between an input thereto and an output to that driving wheel. If this speed is excessive the torque coupling means can overheat or otherwise suffer a reduction in performance capability.

Some embodiments of the present invention have the advantage that because an amount of slip of a wheel of a first axle that is permitted before a reduction in net torque is applied is lower when a split-mu condition exists compared with a non split-mu condition, an amount of slip that must be accommodated by the left and right wheel variable torque coupling means associated with the second axle may be reduced. This has the advantage that deterioration of performance of the variable torque coupling means due to a requirement to accommodate slip corresponding to the first predetermined threshold value between an input thereto and an output thereof may be reduced. This feature may enable a vehicle to operate for longer periods in challenging split-mu conditions, for example when such conditions are encountered whilst attempting to drive up a steep incline.

It is to be understood that, in the case that the left and right wheel variable torque coupling means comprises a pair of clutch devices, the clutch device driving the wheel of the second axle experiencing the higher slip may be caused to open to reduce or substantially prevent driving of that wheel. Accordingly, the amount of heating of that clutch due to a speed difference between input and output portions of that clutch may be reduced by setting the second predetermined threshold value to a value less than the first.

It is to be understood that reference to slip of a wheel is reference to slip of a wheel over ground. Slip of a wheel over ground may be determined to be occurring when a speed of a wheel exceeds a vehicle reference speed, the vehicle reference speed being taken to correspond to a speed of a vehicle over ground. The vehicle reference speed may be calculated by any suitable means, for example by reference to a speed of a slowest turning wheel, reference to a speed of a second slowest turning wheel, reference to an average wheel speed, reference to image data provided by a camera device, and/or by reference to data obtained by means of a radar system or ultrasonic transmit/receive system. Other arrangements are also useful.

It is to be understood that the split-mu condition may be such that driving wheels of the first and second axles experience excessive slip on the same side of a vehicle, e.g. a left side. This may be referred to as a lateral split-mu condition since a difference in mu exists about a longitudinal axis of the vehicle. Alternatively, the split-my condition may be such that driving wheels of the first and second axles experience excessive slip on opposite respective sides. In the latter case the first axle experiences excessive slip on a first side of the vehicle and not a second, whilst the second axle experiences excessive slip on the second side of the vehicle and not the first. This particular split-mu scenario may be referred to as a checkerboard or diagonal split-mu scenario.

The controller may be configured to perform the split-mu operation only when a lateral split-mu condition is detected. Alternatively the controller may be configured to perform the split-mu operation only when a diagonal split-mu condition is detected. In some embodiments the controller may be configured to perform the split-mu operation when either a lateral or a diagonal split-mu scenario is detected.

The controller may be further configured when performing the split-mu operation to cause a reduction in an amount of drive torque applied to one of a left or right wheel of a second axle being a wheel having greater slip, by means of left and right wheel variable torque coupling means of a driveline.

The controller may be operable to cause the reduction in drive torque to one of a left or right wheel by causing a reduction in an amount of torque transmitted by a respective left or right clutch device of the variable torque coupling means.

It is to be understood that the left and right clutch devices may form part of a rear drive unit (RDU) such as the GKN TWINSTER® rear drive module. The RDU may form part of the second axle of a driveline of a vehicle.

Optionally, the first predetermined threshold is in the range from 5 to 10 kph and optionally the second predetermined threshold is in the range from 1 to 4 kph.

Optionally, the first predetermined threshold is in the range from 5 to 8 kph and optionally the second predetermined threshold is greater than 1 kph hut less than 5 kph.

The controller may be operable to receive information indicative of the terrain over which a vehicle is driving, the controller being operable to perform the split-mu mitigation operation in further dependence on the information indicative of the terrain.

Thus, in some embodiments the controller may be configured to allow the split-mu mitigation operation to be performed only when the information indicative of the terrain indicates that the terrain is of a predetermined type.

By the information indicative of terrain is included information indicative of the relief of a driving surface, information indicative of a composition of a driving surface such as rock, loose stones or gravel, grass, snow, ice, asphalt, mud and/or rutted, and any other suitable information.

The controller may be configured to receive information indicative of a terrain over which a vehicle is driving by receiving a signal indicative of the identity of an operating mode in which a vehicle is operating.

It is to be understood that the operating modes may be modes in which one or more vehicle operating parameters are set according to a particular type of terrain in which a vehicle may operate. That is, one or more vehicle operating parameters may be set to different values in dependence on the selected operating mode.

The controller may be configured to in determining whether to perform the split-mu mitigation operation, determine from signals indicative of the terrain over which a vehicle is driving, which of a plurality of operating modes a vehicle should operate in.

The controller may be configured to determine whether to perform the split-mu mitigation operation in dependence on a state of a manual operating mode selector dial.

The controller may be configured to determine whether to perform the split-mu mitigation operation in dependence upon determining which of the plurality of operating modes has been selected automatically by automatic operating mode selection means.

The automatic operating mode selection means may be in the form of computer software code configured to select an appropriate operating mode from the plurality of operating modes and to cause operation of the vehicle in the selected mode. The automatic operating mode selection means may be an automatic operating mode selector implemented in software code, firmware or hardware.

The controller may be operable to perform the split-mu mitigation operation only when a predetermined one or more of the plurality of operating modes is selected.

The controller may be operable to perform the split-mu mitigation operation only when a predetermined one or more off-road operating modes is selected.

The controller may be operable to perform the split-mu mitigation opera ion when an operating mode corresponding to travel over grass, gravel or snow is selected.

The controller may be operable to perform the split-mu operation when it is determined that the vehicle is travelling over grass, gravel or snow.

The controller may be configured not to perform the split-mu operation if it is determined that the vehicle is travelling over sand.

Optionally, the means for determining when a vehicle is operating in a split-mu condition comprises means for determining when a vehicle is operating in a lateral split-mu condition in which wheels of the first and second axles experience excessive slip on only one side of a vehicle, being the same side of a vehicle for the first and second axles, wherein the controller may be configured to perform the split-mu mitigation operation when a lateral split-mu condition is determined to exist.

Thus, the controller determines that a lateral split-mu condition exists if left-side wheels of the first and second axles experience excessive slip whilst the right-side wheels do not, or the right-side wheels of the first and second axles experience excessive slip whilst the left-side wheels do not.

The controller may be configured to perform the split-mu mitigation operation substantially only when a lateral split-mu condition is determined to exist.

The means for determining when a vehicle is operating in a split-mu condition may comprise means for determining when a vehicle is operating in a diagonal split-mu condition in which wheels of the first and second axles experience excessive slip on only one side of the vehicle, being opposite respective sides of the vehicle for the first and second axles, wherein the controller may be configured to perform the split-mu mitigation operation when a diagonal split-mu condition is determined to exist.

Thus, the controller determines that a diagonal split-mu condition exists if a left-side wheel of the first axle and a right-side wheel of the second axle experience excessive slip whilst a right-side wheel of the first axle and a left-side wheel of the second axle do not, or a right-side wheel of the first axle and a left-side wheel of the second axle experience excessive slip whilst a left-side wheel of the first axle and a right-side wheel of the second axle do not.

Optionally, the controller is configured to perform the split-mu mitigation operation substantially only when a diagonal split-mu condition is determined to exist.

In an aspect of the invention for which protection is sought there is provided a motor vehicle control system comprising a controller according to another aspect.

The control system may be configured where the operating modes are control modes of at least one subsystem of a vehicle, the control system having a subsystem controller for initiating control of a vehicle subsystem in the selected one of the plurality of subsystem control modes.

The operating modes may correspond to one or more different driving conditions for a vehicle.

It is to be understood that the different driving conditions may include driving conditions corresponding to driving over different types of terrain. For example one driving condition may correspond to travel over grass/gravel/snow, another driving condition may correspond to travel over sand, and so forth.

The system may comprise evaluation means for evaluating one or more driving condition indicators to determine the extent to which each of the subsystem control modes is appropriate.

The control system may be operable in an automatic operating mode selection condition in which the system is configured automatically to control the subsystem controller to initiate control of the or each subsystem in the subsystem control mode which is most appropriate. In each operating mode the system may be configured to cause each one of a plurality of vehicle subsystems to be operated in a selected one of a plurality of subsystem configuration modes appropriate to the driving condition.

The operating modes may include one or more control modes selected from the following: control modes of at least one vehicle subsystem selected from amongst an engine management system, a transmission system, a steering system, a brakes system and a suspension system;

control modes of a suspension system and the plurality of subsystem configuration modes comprise a plurality of ride heights;

control modes of a fluid suspension system in which fluid interconnection can be made between suspensions for wheels on opposite sides of the vehicle, and wherein said plurality of subsystem configuration modes provide different levels of said interconnection;

control modes of a steering system which can provide steering assistance, and wherein said plurality of subsystem configuration modes provide different levels of said steering assistance;

control modes of a brakes system which can provide braking assistance, and said plurality of subsystem configuration modes provide different levels of said braking assistance;

control modes of a brake control system which can provide an anti-lock function to control wheel slip, and said plurality of subsystem configuration modes allow different levels of said wheel slip;

control modes of a powertrain system which includes a powertrain control means and an accelerator or throttle pedal, the subsystem configuration modes providing different levels of responsiveness of the powertrain control means to movement of the accelerator or throttle pedal;

control modes of a traction control system which is arranged to control wheel spin, and said plurality of subsystem configuration modes allow different levels of said wheel spin control modes of a yaw control system which is arranged to control vehicle yaw, and said plurality of subsystem configuration modes allow different levels of divergence of said vehicle yaw from an expected yaw;

control modes of a range change transmission and said subsystem configuration modes may include a high range mode and a low range mode of said transmission; and control modes of a transmission system operable in a plurality of transmission ratios and including a transmission control means arranged to monitor at least one parameter of the vehicle and to select the transmission ratios in response, and wherein the subsystem configuration modes include a plurality of transmission configuration modes in which the transmission ratios are selected differently in response to said at least one parameter.

In an aspect of the invention for which protection is sought there is provided a driveline comprising a control system according to another aspect.

The driveline may comprise a first axle having respective left and right wheels and a second axle having respective left and right wheels, the driveline being operable to drive wheels of the first axle and wheels of the second axle, wherein the driveline comprises left and right wheel variable torque coupling means configured to vary an amount of torque delivered to respective left and right wheels of the second axle under the control of the control system.

The left and right wheel variable torque coupling means may comprise respective left and right wheel clutch devices.

The respective left and right wheel clutch devices may each comprise a friction clutch device.

The friction clutch device may be in the form of a multi-plate clutch device, optionally a multi-plate wet clutch device.

In an aspect of the invention for which protection is sought there is provided a vehicle comprising a driveline according to a preceding aspect.

In an aspect of the invention for which protection is sought there is provided a motor vehicle controller configured to cause application of brake torque to one or more driving wheels of a first axle of a driveline when an amount of slip of a driving wheel of a first axle exceeds a first predetermined threshold value, the controller being further configured to control an amount of torque applied to respective left and right wheels of a second axle by means of respective left and right variable torque coupling devices of a driveline, the controller comprising means for determining when a vehicle is operating in a split-mu condition in which a difference in surface coefficient of friction between a driving wheel on one side of each of first and second axles and a driving wheel on an opposite side of each of first and second axles exceeds a predetermined amount, wherein when a split-mu condition is determined to exist the controller is configured to cause application of brake torque to a driving wheel of a first axle being a driving wheel of a first axle that is experiencing the greater slip when an amount of slip of that driving wheel exceeds a second predetermined threshold value less than the first.

In another aspect of the invention for which protection is sought there is provided a method of controlling a driveline of a motor vehicle, the method being implemented by means of a computing device, the method comprising:

causing a reduction in an amount of net drive torque applied to one or more driving wheels of a first axle of a driveline when an amount of slip of a driving wheel of a first axle exceeds a first predetermined threshold value, controlling an amount of torque applied to respective left and right wheels of a second axle by means of left and right wheel variable torque coupling means of a driveline, determining when a vehicle is operating in a split-mu condition in which slip of a driving wheel on one side of each of first and second axles exceeds that of a driving wheel on an opposite side of each of first and second axles by more than a predetermined amount, the method comprising performing a split-mu mitigation operation when a split-mu condition is determined to exist, whereby performing the split-mu operation comprises causing a reduction in net torque applied to a driving wheel of a first axle that is experiencing the greater slip when an amount of slip of that driving wheel exceeds a second predetermined threshold value less than the first.

It is to be understood that by reference to an axle of a vehicle is meant reference to a given transverse pair of wheels such as a front pair of wheels or a rear pair of wheels, whether or not the wheels of a transverse pair are connected.

The controller is able to determine when a vehicle is operating in a condition in which at least a front axle of a four wheel drive vehicle is experiencing split-mu conditions. That is, one wheel of the front axle is experiencing slip that exceeds slip of the other wheel of the front axle by more than a prescribed amount. The vehicle may have a prop-shaft that transmits drive torque to a rear drive unit having respective left and right clutch devices for distributing drive torque to left and right wheels of the rear axle respectively. The clutch devices may be arranged to accommodate a difference in wheel speed between respective left and right wheels, and therefore perform a role that is otherwise typically performed by a differential gearbox arrangement. The problem exists that when the split-mu condition exists, an input portion such as an input shaft of the rear drive unit spins at a speed corresponding to that of the faster turning wheel of the front axle and as such the left and/or right clutch device driving a wheel of the rear axle experiencing lower slip than the faster turning wheel of the front axle may be required to accommodate a not insubstantial speed difference thereacross. Accordingly, when the controller determines that a split-mu condition exists in respect of the front axle, the controller reduces the speed of the wheel of the front axle experiencing higher slip. This results in a reduction in speed difference across one or both clutches of the rear drive unit, reducing a thermal load on the rear drive unit. The present invention may permit a vehicle to operate in split mu conditions for a longer period of time without the rear drive unit suffering an excessive thermal loading that may cause damage and/or cause a reduction in duty cycle of the rear drive unit at a given moment in time.

Within the scope of the claims it is envisaged that the various aspects, embodiments, examples and alternatives, and in particular the individual features thereof, set out in the preceding paragraphs, and/or in the following description and drawings, may be taken independently or in any combination. For example features described in connection with one embodiment are applicable to all embodiments, unless such features are incompatible.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

Embodiments of the invention will now be described with reference to the accompanying figures in which.

DETAILED DESCRIPTION

Figure 1:
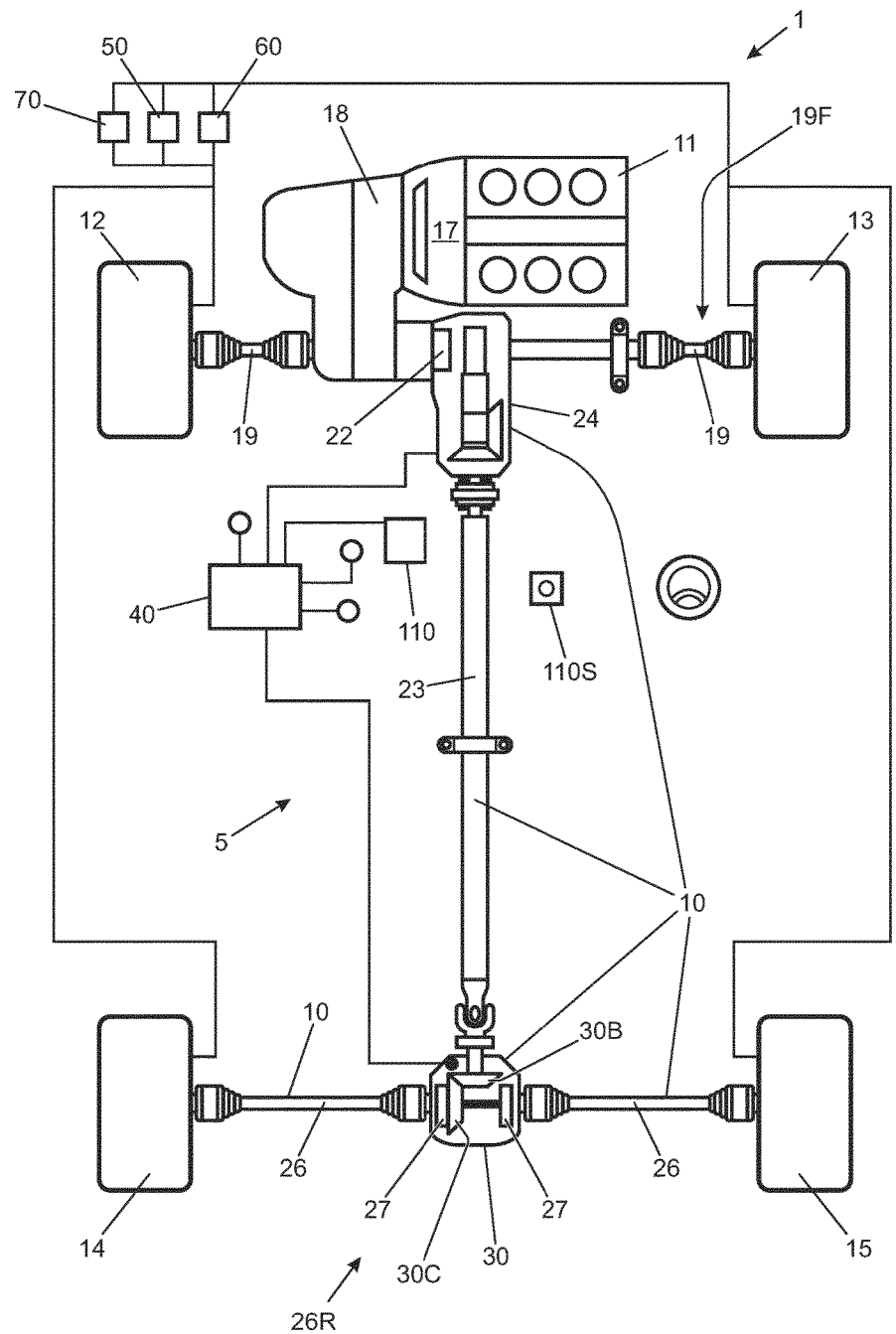
FIG. 1 is a schematic illustration of a vehicle according to an embodiment of the present invention.

A driveline 5 of a motor vehicle 1 according to an embodiment of the present invention is illustrated schematically in FIG. 1. The driveline 5 is connected to a prime mover in the form of an internal combustion engine 11 by means of a gear box 18, and has a pair of front wheels 12, 13, an auxiliary portion 10 and a pair of rear wheels 14, 15.

The driveline 5 is arranged selectively to transmit power supplied to it by the gearbox 18 from the internal combustion engine 11 to the front wheels 12, 13 only (in a two wheel drive mode of operation) or to the front wheels 12, 13 and the rear wheels 14, 15 simultaneously (in a four wheel drive mode of operation).

Power is transmitted from the internal combustion engine 11 to the front wheels 12, 13 by means of a clutch 17, a gearbox 18 and a pair of front drive shafts 19. The front drive shafts 19 in combination with front wheels 12, 13 may be referred to as a front axle 19F portion of the driveline 5.

Power is transmitted to the rear wheels 14, 15 by means of the auxiliary portion 10 of the driveline 5. The auxiliary portion 10 has a power transfer unit (PTU) 24 having a power transfer clutch (PTC) 22 operable to connect a main drive shaft or prop shaft 23 of the auxiliary portion 10 to the gearbox 18.

The prop shaft 23 is coupled in turn to a rear drive unit (RDU) 30 operable to couple the prop shaft 23 to the rear drive shafts 26.

The RDU 30 (FIG. 1) has a pair of clutches 27 by means of which the RDU 30 is operable to connect the prop shaft 23 to the rear drive shafts 26 when the four wheel drive mode of operation is required. An input shaft of each of the clutches 27 is driven by a crown wheel 30c which is in turn driven by a bevel gear 30b that is fixedly coupled to the prop shaft 23. The rear drive shafts 26 in combination with RDU 30 and rear wheels 14, 15 may be referred to as a rear axle portion 26R of the driveline 5.

The controller 40 of the driveline 5 is arranged to control operation of the PTU 24 and clutches 27 of the RDU 20. When a four wheel drive mode of operation is required the controller 40 is arranged to close the PTC 22 and to close clutches 27 of the RDU 30. Since the driveline 5 forms part of a powertrain, which includes the engine 11 and gearbox 18, the controller 40 may in some embodiments control the engine 11 and optionally the gearbox 18 in addition to the driveline 5 and be referred to as a powertrain controller.

In the embodiment of FIG. 1 the PTC 22 and differential clutches 27 have respective actuators operable to close the respective clutches 27 at a selected one of a plurality of different rates. This allows the transition from the two wheel drive mode of operation to the four wheel drive mode of operation to be made at one of a corresponding plurality of different rates. It is to be understood that, in the case of a friction clutch, as the clutch is closed, a maximum amount of torque that the clutch is able to transmit from an input to an output thereof increases to a maximum transfer torque value associated with the closed (or 'fully closed') condition. In the case of a multi-plate wet clutch the maximum amount of torque the clutch can transmit may be responsive at least in part to an amount of pressure applied to the plates of the clutch to maintain the clutch in the closed condition.

It is to be understood that in the present embodiment the controller 40 is operable to control the driveline 5 to assume the four wheel drive mode responsive to a selection of a required vehicle operating mode or characteristic by a driver, or automatically, in response to a value of one or more vehicle operating parameters.

In the present embodiment, if the driveline 5 is in the two wheel drive mode and the controller 40 detects that front wheels 12, 13 of the vehicle 1 are suffering spin exceeding a prescribed amount, for example due to an oversupply of torque for the prevailing surface conditions, the controller may control the driveline 5 automatically to assume the four wheel drive mode. This allows the rear wheels 14, 15 to drive the vehicle in addition to the front wheels 12, 13 and thereby promote motion of the vehicle 1 over a driving surface.

The vehicle 1 is provided with an antilock braking system (ABS) controller 50 arranged to control a brake of one or more wheels of the vehicle 1 to reduce an amount of braking action when required in order to prevent skidding. The vehicle 1 also has a dynamic stability control system (DSC) controller 60 arranged to control an amount of torque delivered to one or more wheels of the vehicle 1 to assist a vehicle in maintaining a desired path over ground, and. Furthermore, the vehicle 1 has a traction control system (TCS) controller 70 arranged to monitor a speed of driven wheels of the vehicle 1 and an actual speed of the vehicle over ground. The TCS controller 70 is configured to detect wheel slip due to a speed of a wheel exceeding the speed of the vehicle over ground. If the amount of wheel slip exceeds a predetermined value the TCS controller 70 commands a reduction in an amount of net torque applied to the wheel by application of a brake to the wheel or by reducing the amount of powertrain torque applied to the wheel.

Figure 2:
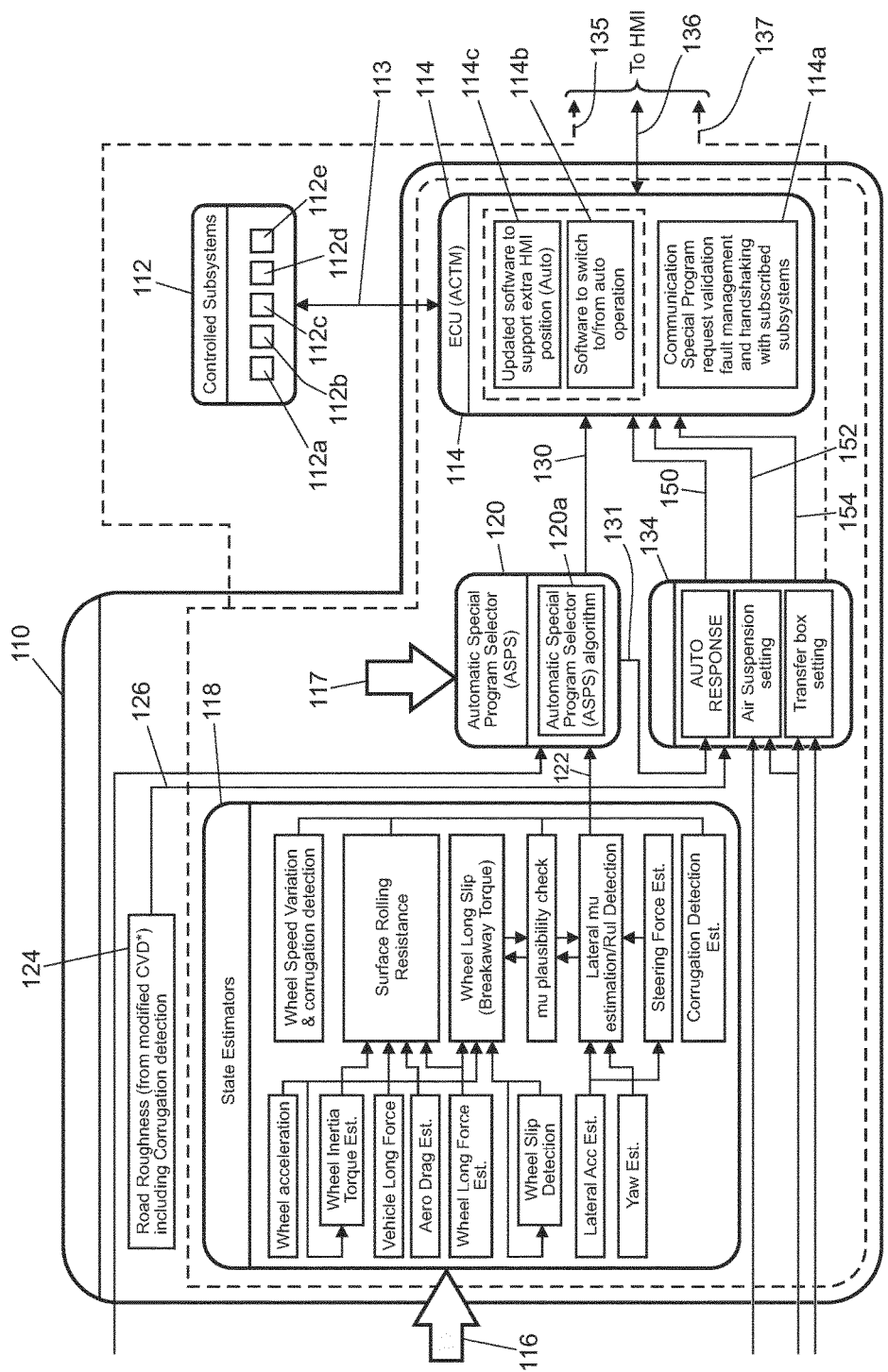
FIG. 2 is a schematic illustration of a portion of a control system of the vehicle according to the embodiment of FIG. 1.

The vehicle 1 of FIG. 1 has a vehicle control unit (VCU) 110. FIG. 2 shows the VCU 110 in more detail. The VCU 110 is operable to control a plurality of vehicle subsystems 112 including, but not limited to, an engine management system 112a, a transmission system 112b, an electronic power assisted steering unit 112c (ePAS unit), a brakes system 112d that includes ABS controller 50 and a suspension system 121e. Although five subsystems 112 are illustrated as being under the control of the VCU 110, in practice a greater number of vehicle subsystems 112 may be included on the vehicle and may be under the control of the VCU 110. The VCU 110 includes a subsystem control module 114 which provides control signals via line 113 to each of the vehicle subsystems 112 to initiate control of the subsystems 112 in a manner appropriate to the driving condition, such as the terrain or driving surface, in which the vehicle is travelling (referred to as the terrain condition). The subsystems 112 also communicate with the subsystems control module 114 via signal line 113 to feedback information on subsystem status.

For purposes of this disclosure, and notwithstanding the above, it is to be understood that the controller(s) or ECU(s) described herein may each comprise a control unit or computational device having one or more electronic processors. Vehicle 1 and/or a subsystem 12 thereof may comprise a single control unit or electronic controller or alternatively different functions of the controller(s) may be embodied in, or hosted in, different control units or controllers. As used herein, the term "control unit" will be understood to include both a single control unit or controller and a plurality of control units or controllers collectively operating to provide the required control functionality. A set of instructions could be provided which, when executed, cause said controller(s) or control unit(s) to implement the control techniques described herein (including the method(s) described below). The set of instructions may be embedded in one or more electronic processors, or alternatively, may be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present invention is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

It will be appreciated that the foregoing represents only some of the possibilities with respect to the particular subsystems of vehicle 1 that may be included, as well as the arrangement of those subsystems with VCU 110. Accordingly, it will be further appreciated that embodiments of vehicle 1 including other or additional subsystems and subsystem/VCU arrangements remain within the spirit and scope of the present invention.

As described in more detail below, the VCU 110 is operable to control the subsystems 112 to operate in one of a plurality of control modes, which may also be referred to as driving modes or terrain response (TR) modes. In each control mode, each subsystem is caused to assume one of a plurality of subsystem configuration modes. The control modes include a grass/gravel/snow control mode (GGS mode) that is suitable for when the vehicle is travelling over grass, gravel or snow terrain, a mud/ruts control mode (MR mode) which is suitable for when the vehicle is travelling over mud and ruts terrain, a rock crawl/boulder mode (RB mode) which is suitable for when the vehicle is travelling over rock or boulder terrain, a sand mode which is suitable for when the vehicle is travelling over sand terrain (or deep soft snow) and a special programs OFF mode (SP OFF mode) which is a suitable compromise mode, or general mode, for all terrain conditions and especially vehicle travel on motorways and regular roadways. Many other control modes are also envisaged.

The different terrain types are grouped according to the friction of the terrain and the roughness of the terrain. For example, it is appropriate to group grass, gravel and snow together as terrains that provide a low friction, smooth surface and it is appropriate to group rock and boulder terrains together as high friction, very high roughness terrains.

A user may select a required control mode by means of control mode selector 110S shown in FIG. 1. The selector 110S is in the form of a dial that may be rotated to select the appropriate control mode. Systems implementing this functionality are known, and are described for example in US2003/0200016, the content of which is hereby incorporated by reference.

In addition to allowing manual section of a required control mode, the VCU 110 is also configured to determine automatically an appropriate control mode when the VCU 110 is placed in an automatic mode selection mode or condition as described further below.

The VCU 110 receives a plurality of signals, represented generally at 116 and 117, from a plurality of vehicle sensors and are representative of a variety of different parameters associated with vehicle motion and status. As described in further detail below, the signals 116, 117 provide, or are used to calculate, a plurality of driving condition indicators (also referred to as terrain indicators) which are indicative of the nature of the terrain in which the vehicle is travelling. One advantageous feature of some embodiments of the present invention is that the VCU 110 determines the most appropriate control mode for the various subsystems on the basis of the terrain indicators, and automatically controls the subsystems accordingly.

The sensors (not shown) on the vehicle include, but are not limited to, sensors which provide continuous sensor outputs 116 to the VCU 110, including wheel speed sensors, an ambient temperature sensor, an atmospheric pressure sensor, tyre pressure sensors, yaw sensors to detect yaw, roll and pitch of the vehicle, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor (part of DSC 60), a brake pedal position sensor, an accelerator pedal position sensor and longitudinal, lateral, and vertical motion sensors.

In other embodiments, only a selection of the aforementioned sensors may be used. The VCU 110 also receives a signal from the electronic power assisted steering unit (ePAS unit 112c) of the vehicle 1 to indicate the steering force that is applied to the wheels (steering force applied by the driver combined with steering force applied by the ePAS unit 112c).

The vehicle 1 is also provided with a plurality of sensors which provide discrete sensor outputs 117 to the VCU 110, including a cruise control status signal (ON/OFF), a transfer box or PTU status signal 137 (indicating whether a gear ratio of the PTU 137 is set to a HI range or a LO range), a Hill Descent Control (HDC) status signal (ON/OFF), a trailer connect status signal (ON/OFF), a windscreen wiper signal (ON/OFF), an air suspension status signal (HI/LO), a DSC signal (ON/OFF) and a TCS signal (ON/OFF). It is to be understood that the DSC and TCS signals each provide an indication as to whether the DSC or TCS systems 60, 70 are currently intervening to cause application of brake torque and/or powertrain torque, as appropriate, to improve vehicle stability or traction.

The VCU 110 includes an evaluation means in the form of an estimator module or processor 118 and a calculation and selection means in the form of a selector module or processor 120. Initially the continuous outputs 116 from the sensors are provided to the estimator module 118 whereas the discrete signals 117 are provided to the selector module 120.

Within a first stage of the estimator module 118, various ones of the sensor outputs 116 are used to derive a number of terrain indicators. In a first stage of the estimator module 118, a vehicle speed is derived from the wheel speed sensors, wheel acceleration is derived from the wheel speed sensors, the longitudinal force on the wheels is derived from the vehicle longitudinal acceleration sensor, and the torque at which wheel slip occurs (if wheel slip occurs) is derived from engine torque signals generated by engine management system 112a. In some embodiment the signals are received by the VCU 110 from the engine management system 112a by means of a controller area network (CAN) bus or the like.

Other calculations performed within the first stage of the estimator module 118 include the wheel inertia torque (the torque associated with accelerating or decelerating the rotating wheels), "continuity of progress" (the assessment of whether the vehicle is starting and stopping, for example as may be the case when the vehicle is travelling over rocky terrain), aerodynamic drag, yaw, and lateral vehicle acceleration.

The estimator module 118 also includes a second stage in which the following terrain indicators are calculated: surface rolling resistance (based on the wheel inertia torque, the longitudinal force on the vehicle, aerodynamic drag, and the longitudinal force on the wheels), the steering force on the steering wheel (based on the lateral acceleration and the output from the steering wheel sensor), the wheel longitudinal slip (based on the longitudinal force on the wheels, the wheel acceleration, DSC/TCS activity and a signal indicative of whether wheel slip has occurred), lateral friction (calculated from the measured lateral acceleration and the yaw versus the predicted lateral acceleration and yaw), and corrugation detection (high frequency, low amplitude wheel height excitement indicative of a washboard type surface).

On the basis of the windscreen wiper signal (ON/OFF), the estimator module 118 also calculates how long the windscreen wipers have been in an ON state (i.e. a rain duration signal).

The VCU 110 also includes a road roughness module 124 for calculating the terrain roughness based on the air suspension sensors (the ride height sensors) and the wheel accelerometers. A terrain indicator signal in the form of a roughness output signal 126 is output from the road roughness module 124.

The estimates for the wheel longitudinal slip and the lateral friction estimation are compared with one another within the estimator module 118 as a plausibility check.

Calculations for wheel speed variation and corrugation output, the surface rolling resistance estimation, the wheel longitudinal slip and the corrugation detection, together with the friction plausibility check, are output from the estimator module 118 and provide terrain indicator output signals 122, indicative of the nature of the terrain in which the vehicle is travelling, for further processing within the VCU 110.

The terrain indicator signals 122 from the estimator module 118 are provided to the selector module 120 for determining which of a plurality of vehicle subsystem control modes is most appropriate based on the indicators of the type of terrain in which the vehicle is travelling. The most appropriate control mode is determined by analysing the probability that each of the different control modes is appropriate on the basis of the terrain indicator signals 122, 126 from the estimator module 118 and the road roughness module 124.

As noted above, the vehicle subsystems 112 may be controlled automatically (referred to as the "automatic mode") in response to a control output signal 130 from the selector module 120 and without the need for driver input. Alternatively, the vehicle subsystems 112 may be operated in response to a manual driver input (referred to as "manual mode"), the input being provided by means of a selector 110S. The subsystem controller 114 may itself control the vehicle subsystems 112a-112e directly via the signal line 113, or alternatively each subsystem may be provided with its own associated intermediate controller for providing control of the relevant subsystem 112a-112e. In the latter case the subsystem controller 114 may only control the selection of the most appropriate subsystem control mode for the subsystems 112a-112e, rather than implementing the actual control steps for the subsystems. The or each intermediate controller may in practice form an integral part of the main subsystem controller 114.

The manner in which the VCU 110 selects the most appropriate subsystem control mode when operating in the automatic mode is described in GB2492655, the content of which is incorporated herein by reference.

When operating in the four wheel drive mode with PTC 22 closed and clutches 27 of RDU 30 configured to transmit drive torque to the rear wheels 14, 15, the driveline controller 40 monitors a speed of each of the wheels 12-15 of the vehicle 1 based on the wheel speed signals generated by the wheel speed sensors.

The TCS controller 70 can comprise an electronic processor having an electrical input for receiving one or more signals indicative of values of wheel speed; and an electronic memory device electrically coupled to the electronic processor and having instructions stored therein. The processor accesses the memory device and executes the instructions stored therein such that it is operable as described below. The TCS controller 70 continually monitors the speed of each wheel 12-15 of the vehicle in order to determine whether any wheel of the vehicle 1 is suffering slip due to a speed of the wheel exceeding a speed of the vehicle over ground. The TCS controller 70 achieves this by monitoring a speed of each wheel relative to a vehicle reference speed value calculated by the ABS controller 50, taking into account changes in wheel speed relative to vehicle reference speed due to cornering. If the TCS controller 70 determines that a speed of one or more wheels 12-15 of the vehicle 1 exceeds the vehicle reference speed by more than a first predetermined threshold amount TCS_thresh_1, the TCS controller 70 causes a reduction in speed of that wheel. In the case that the speed of the one or more wheels of the front axle 19F exceeds vehicle speed by more than TCS_thresh_1, the TCS controller 70 commands application of a brake to that wheel by issuing a brake application request to ABS controller 50. Alternatively or in addition in some embodiments the TCS controller 70 may cause a reduction in powertrain torque to that wheel by issuing a corresponding request to driveline controller 40 and/or engine management system 112a.

If the TCS controller 70 determines that a speed of one or more wheels of the rear axle 19R exceeds vehicle reference speed by more than TCS_thresh_1, the TCS controller 70 commands the driveline controller 40 to reduce the amount of torque delivered to that one or more wheel by reducing an amount of torque coupling across the corresponding clutch(es) 27. In some embodiments the TCS controller 70 commands the corresponding clutch(es) 27 to open thereby substantially to prevent torque transfer thereacross. The TCS controller 70 may then begin to increase the amount of torque coupling across the clutch(es) 27 to drive the corresponding wheel at a speed corresponding to vehicle speed. In the case of a vehicle 100 that suffers excessive wheel slip when accelerating from rest, torque coupling across the clutch(es) may be restored in dependence on vehicle speed, the amount increasing as vehicle speed increases. Other arrangements are also useful.

The present applicant has discovered that vehicle performance can be compromised when a 'split-mu' condition exists in respect of prevailing terrain. A split-mu condition is determined to exist if a difference in speed between respective wheels 12, 13 of the front axle 19F and between respective wheels 14, 15 of the rear axle 19R exceeds a predetermined amount due to a difference in surface coefficient of friction ('surface mu') between respective left and right wheels of each axle 19F, 19R. As will be appreciated, if the wheels on an axle are rotating at different speeds at least one of the wheels must be slipping, or the two wheels must be slipping at a different rate, either of which indicates that the surface friction available at each wheel of the axle is different. Vehicle performance may be compromised because an increase in temperature of RDU 30 may occur due to a prolonged, relatively large speed difference across the clutch 27 corresponding to the rear wheel 14, 15 on the terrain of lower surface mu due to opening of the clutch 27 to reduce the speed of rotation of the corresponding wheel 14, 15.

In the present embodiment, to determine if there is a split-mu surface, the system identifies if the slip at one wheel of each axle exceeds the slip at the other wheel of that axle. To do this the TCS controller 70 monitors the speed of each wheel 12-15 and determines repeatedly whether a difference in speed between respective left and right wheels of each axle 19F, 19R exceeds a predetermined amount. If such a condition is found to exist, the controller 40 determines that a split-mu condition exists.

If a split-mu condition is deemed to exist then the TCS controller 70 monitors a speed of each wheel relative to a vehicle reference speed value calculated by the ABS controller 50, again taking into account changes in wheel speed relative to vehicle reference speed due to cornering. If the TCS controller 70 determines that a speed of one or more wheels 12-15 of the vehicle 1 exceeds the vehicle reference speed by more than a second predetermined threshold amount TCS_thresh_2, the TCS controller 70 causes a reduction in speed of that wheel. In the case that the speed of the one or more wheels of the front axle 19F exceeds vehicle speed by more than TCS_thresh_2, the TCS controller 70 commands application of a brake to that wheel by issuing a brake application request to ABS controller 50 in order to slow that wheel 12, 13. Alternatively or in addition in some embodiments the TCS controller 70 may cause a reduction in powertrain torque to that wheel by issuing a corresponding request to driveline controller 40 and/or engine management system 112a. The TCS controller 70 also commands the driveline controller 40 to reduce an amount of torque delivered to the faster turning rear wheel 14, 15 in order to slow that wheel 14, 15. The driveline controller 40 responds by reducing the amount of pressure applied to the corresponding clutch 27 of RDU 30 in order to reduce the amount of torque transmitted to the faster turning wheel 14,15.

The value of TCS_thresh_2 is lower than that of TCS_thresh_1. In the present embodiment, TCS_thresh_2 is substantially equal to 2 kph although other values are also useful. Furthermore TCS_thresh_2 may be variable, it may for example be useful to increase the value in some embodiments, or when travelling over surfaces that can withstanding higher values of slip without suffering excessive modification.

The value of TCS_thresh_2 is typically set to a value that is sufficiently low that excessive heating of or wear of the clutches 27 under sustained operation in split-mu conditions is avoided. The value of TCS_thresh_2 may be set in dependence on one or more of vehicle speed, a temperature of the clutch 27 corresponding to the slipping wheel or another temperature associated with RDU 30 or in dependence on any other suitable parameter. The value of TCS_thresh_2 may be arranged to increase as a function of increasing vehicle speed. Alternatively or in addition the value of TCS_thresh_2 may be arranged to decrease as a function of increase in a temperature associated with RDU 30 such as a temperature of or indicative of a temperature of one or both clutches 27.

It is to be understood that because the speed of the faster turning wheel 14, 15 of the rear axle 19R can be reduced without application of a brake to the wheel 14, 15, an amount of torque that the engine 121 is required to develop in order to maintain progress of the vehicle 1 is reduced. The driveline 5 typically presents less resistance to driving thereof by the engine 121, and less energy developed by the engine 121 is dissipated as heat. Torque that would otherwise be opposed by application of brake force is transferred to the other wheel 15, 14 of the rear axle 19R in order to promote progress of the vehicle 1 over terrain. Accordingly, the fact that the value of TCS_thresh_2 is lower than that of TCS_thresh_1, and that as a consequence brake or engine power reduction is commanded at correspondingly lower engine speeds, does not overly compromise a rate of progress of the vehicle 1 over terrain.

It is to be understood that, if the RDU 30 is replaced by a conventional differential and brake torque is applied to slow the rear wheel, a greater engine speed is required in order to ensure adequate vehicle progress especially when driving uphill due to the torque applied by the brake to the driveline 5 opposing driveline rotation.

Figure 3:
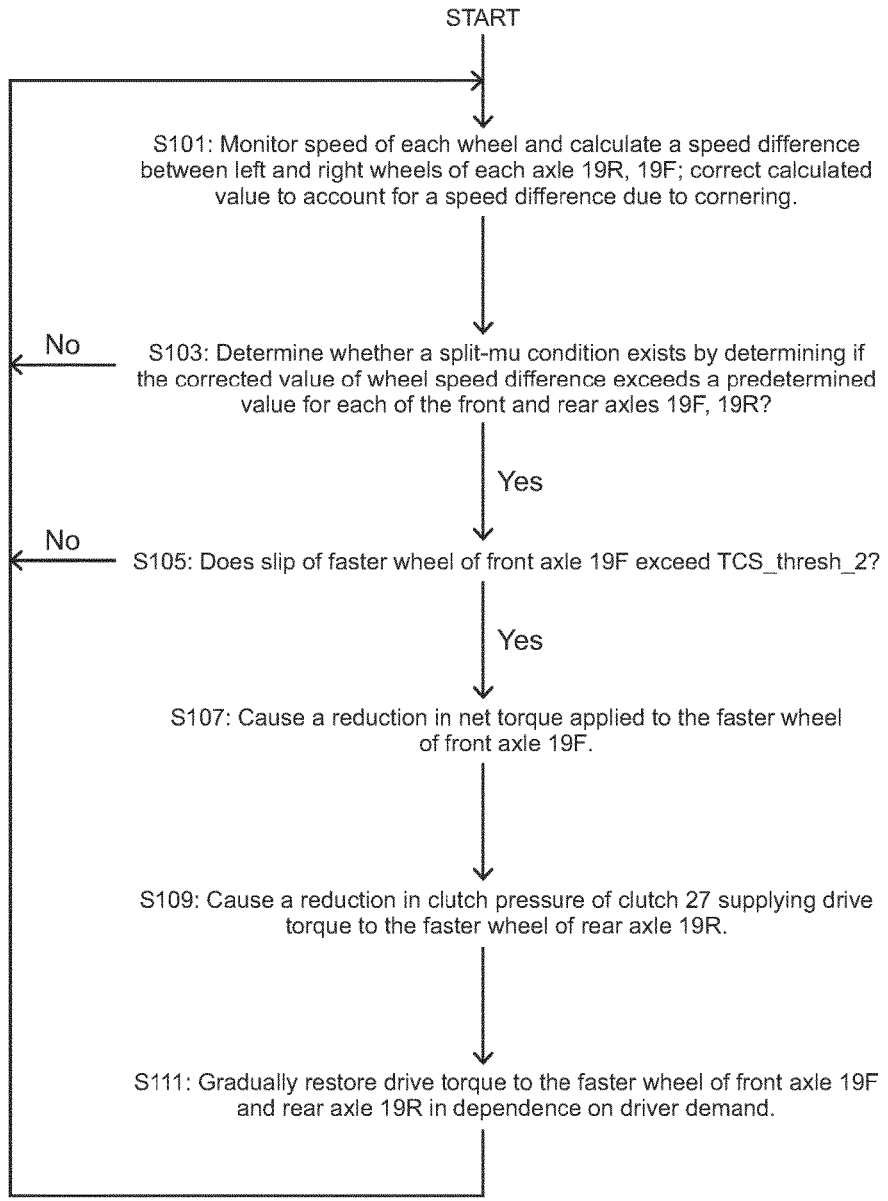
FIG. 3 is a flow diagram of a method of operation of a driveline in a vehicle according to the embodiment of FIG. 1.

FIG. 3 illustrates a method of vehicle control according to an embodiment of the present invention.

At step S101 TCS controller 70 is monitoring a speed of each wheel 12-15 of the vehicle 1 and calculates a difference between left and right wheels of each axle 19F, 19R. If the vehicle 1 is cornering, the controller 70 calculates the expected difference in wheel speeds due to cornering in the absence of any wheel slip and subtracts the expected difference from the outside wheel to obtain a corrected speed value. The controller 70 then determines the difference in speed between the left and right wheels of each of the front and rear axles 19F, 19R, using the corrected wheel speed values.

At step S103 the TCS controller 70 determines whether a split-mu condition exists by determining if the difference in wheel speed between left and right wheels of each of the front and rear axles 19F, 19R exceeds a predetermined value. If the differences do exceed a predetermined value, the controller 70 continues at step S105, otherwise the controller continues at step S101.

In the present embodiment the difference in wheel slip between left and right wheels of the front axle 19R and the difference in wheel slip between left and right wheels of the rear axle 19F must exceed 2 kph in order for the controller to determine that a split-mu condition exists. It is to be understood that in the present embodiment the predetermined value increases with vehicle speed; for example, for vehicle speeds in excess of 50 kph the wheel speed difference may have to exceed 5 kph before the controller 70 determines that a split mu condition exists.

At step S105 the controller 70 determines whether a speed difference between faster of the left and right wheels of front axle 19F and the reference velocity of the vehicle indicates that the slip of that wheel exceeds a predetermined value TCS_thresh_2. If this condition is true the controller 70 continues at step S107, else the controller 70 continues at step S101. In the present embodiment the value of TCS_thresh_2 is 2 kph although other values are also useful.

At step S107 the TCS controller 70 causes a reduction in the amount of net torque applied to the faster turning wheel of front axle 19F by requesting ABS controller 50 to apply brake torque to that wheel.

At step S109, the TCS controller 70 causes a reduction in clutch pressure of the clutch 27 supplying drive torque to the faster turning wheel of rear axle 19R. It is to be understood that in some embodiments step S109 may be performed before step 3107. In the present embodiment, steps 107 and S109 are effectively performed substantially simultaneously.

At step S111, the TCS controller 70 causes a reduction in the amount of brake force applied to the wheel of front axle 19F to which brake torque has been applied, and a gradual increase in the amount of pressure applied to the clutch 27 for which clutch pressure has been reduced. It is to be understood that the reduction in brake force and increase in clutch pressure may be performed after a prescribed amount of time or in some embodiments after a prescribed amount of distance travelled, in order to enable resumption in drive torque application in order to promote motion of a vehicle over a driving surface. Other arrangements are also useful.

The method then continues at step S101.

Some embodiments of the present invention have the advantage that motion of a vehicle over a split-mu surface may be conducted for longer periods of time and/or with reduced deterioration of driveline integrity or performance compared with known drivelines. This is at least in part because the threshold for activation of the traction control system or other vehicle wheel slip control system is reduced relative to non split-mu conditions, resulting in some embodiments in a reduction in an amount of relative rotation across a rear drive unit controlling the distribution of drive torque between rear wheels of a motor vehicle. Other benefits may include a reduction in an amount of powertrain drive torque that must be developed by a prime mover such as an engine, electric motor and/or one or more other prime movers in order to move a vehicle. This is at least in part because a reduction in drive torque to a rear wheel may be effected by reducing torque coupling to a rear wheel, rather than by application of brake force opposing driveline drive torque.

It is to be understood that some embodiments of the present invention are suitable for use in a number of different vehicle types including permanent all wheel drive vehicles such as permanent four wheel drive vehicles, or vehicles that have drivelines that are switchable between four wheel drive and two wheel drive configurations. Some embodiments of the present invention are suitable for use with vehicles in which a plurality of axles are driven by a driveline and in which an amount of torque coupling between a prime mover and one or both axles that is provided by a driveline may be adjusted. The amount of torque coupling may for example by adjusted in dependence on speed, rate of acceleration and/or any other suitable parameter in addition or instead.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A motor vehicle controller configured to cause a reduction in an amount of net drive torque applied to one or more driving wheels of a first axle of a driveline when an amount of slip of a driving wheel of said first axle exceeds a first predetermined threshold value,
the controller being further configured to control an amount of torque applied to respective left and right wheels of a second axle by means of left and right wheel variable torque coupling means of the driveline,
the controller comprising means for determining when a vehicle is operating in a split-mu condition in which slip of a driving wheel on one side of each of said first and second axles exceeds that of a driving wheel on an opposite side of each of said first and second axles by more than a predetermined amount,
wherein when the split-mu condition is determined to exist the controller is configured to perform a split-mu mitigation operation in which the controller causes a reduction in net torque applied to the driving wheel of said first axle that is experiencing the greater slip when an amount of slip of that driving wheel exceeds a second predetermined threshold value less than the first predetermined threshold value.

2. A controller according to claim 1 wherein causing the reduction in the amount of net drive torque applied to one or more driving wheels of the first axle of the driveline when the amount of slip of the driving wheel of said first axle exceeds the first predetermined threshold value is performed in a first control mode, and
causing the reduction in net torque applied to the driving wheel of said first axle that is experiencing the greater slip when the amount of slip of that driving wheel exceeds the second predetermined threshold value less than the first predetermined threshold value is performed in a second control mode.

3. A controller according to claim 1 further configured when performing the split-mu mitigation operation to cause a reduction in an amount of drive torque applied to one of the left or right wheel of said second axle being a wheel having greater slip, by means of left and right wheel variable torque coupling means of said driveline.

4. A controller according to claim 3 operable to cause the reduction in drive torque to one of the left or right wheel by causing a reduction in an amount of torque transmitted by a respective left or right clutch device of the variable torque coupling means.

5. A controller according to claim 1 operable to receive information indicative of a terrain over which the vehicle is driving, the controller being operable to perform the split-mu mitigation operation in further dependence on the information indicative of the terrain.

6. A controller according to claim 5 configured to receive information indicative of the terrain over which the vehicle is driving by receiving a signal indicative of the identity of an operating mode in which the vehicle is operating.

7. A controller according to claim 6 configured to determine whether to perform the split-mu mitigation operation in dependence on a state of a manual operating mode selector dial.

8. A driveline comprising a control system having a motor vehicle controller according to claim 6 configured to determine whether to perform the split-mu mitigation operation in dependence upon determining which of a plurality of operating modes has been selected automatically by automatic operating mode selection means, and in determining whether to perform the split-mu mitigation operation, determine from signals indicative of the terrain over which the vehicle is driving, which of a plurality of operating modes the vehicle should operate in.

9. A driveline according to claim 8 comprising the first axle having respective left and right wheels and the second axle having respective left and right wheels, the driveline being operable to drive wheels of the first axle and wheels of the second axle, wherein the driveline comprises left and right wheel variable torque coupling means configured to vary an amount of torque delivered to respective left and right wheels of the second axle under the control of the control system.

10. A driveline according to claim 9 wherein the left and right wheel variable torque coupling means comprises respective left and right wheel clutch devices.

11. A driveline according to claim 10 wherein the respective left and right wheel clutch devices each comprise a friction clutch device.

12. A controller according to claim 5 operable to perform the split-mu mitigation operation only when a predetermined one or more of a plurality of operating modes is selected.

13. A controller according to claim 12 operable to perform the split-mu mitigation operation only when a predetermined one or more off-road operating modes is selected.

14. A controller according to claim 5 operable to perform the split-mu mitigation operation when it is determined that the vehicle is travelling over grass, gravel or snow.

15. A controller according to claim 5 configured not to perform the split-mu mitigation operation if it is determined that the vehicle is travelling over sand.

16. A controller according to claim 1 wherein the means for determining when the vehicle is operating in the split-mu condition comprises means for determining when the vehicle is operating in a lateral split-mu condition in which wheels of the first and second axles experience excessive slip on only one side of the vehicle, being the same side of the vehicle for the first and second axles, wherein the controller is configured to perform the split-mu mitigation operation when the lateral split-mu condition is determined to exist.

17. A controller according to claim 16 configured to perform the split-mu mitigation operation substantially only when the lateral split-mu condition is determined to exist.

18. A controller according to claim 1 wherein the means for determining when the vehicle is operating in the split-mu condition comprises means for determining when the vehicle is operating in a diagonal split-mu condition in which wheels of the first and second axles experience excessive slip on only one side of the vehicle, being opposite respective sides of the vehicle for the first and second axles, wherein the controller is configured to perform the split-mu mitigation operation when the diagonal split-mu condition is determined to exist.

19. A controller according to claim 18 configured to perform the split-mu mitigation operation substantially only when the diagonal split-mu condition is determined to exist.

20. A method of controlling a driveline of a motor vehicle, the method being implemented by means of a computing device, the method comprising:

causing a reduction in an amount of net drive torque applied to one or more driving wheels of a first axle of a driveline when an amount of slip of a driving wheel of said first axle exceeds a first predetermined threshold value, controlling an amount of torque applied to respective left and right wheels of a second axle by means of left and right wheel variable torque coupling means of the driveline, determining when a vehicle is operating in a split-mu condition in which slip of a driving wheel on one side of each of said first and second axles exceeds that of a driving wheel on an opposite side of each of said first and second axles by more than a predetermined amount, the method comprising performing a split-mu mitigation operation when the split-mu condition is determined to exist, whereby performing the split-mu mitigation operation comprises causing a reduction in net torque applied to the driving wheel of said first axle that is experiencing the greater slip when an amount of slip of that driving wheel exceeds a second predetermined threshold value less than the first predetermined threshold value.

\* \* \* \* \*